United States Patent
Tolt et al.

(10) Patent No.: US 6,313,829 B1
(45) Date of Patent: Nov. 6, 2001

(54) EDGE TREATMENT METHOD FOR ULTRASONIC WAVE ABSORPTION

(75) Inventors: Thomas L. Tolt, Austin, TX (US); Terence J. Knowles, Barrington, IL (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/184,104

(22) Filed: Nov. 2, 1998

(51) Int. Cl.[7] .............................. G09G 5/00; G06K 11/06; G06K 11/14; G06K 11/18; G08C 21/00
(52) U.S. Cl. ...................... 345/177; 345/179; 178/18.01; 178/18.03; 178/18.04; 178/19.01; 178/19.02
(58) Field of Search ..................................... 345/173, 177, 345/179; 178/18.01, 18.03, 18.04, 19.01, 19.02

(56) References Cited

U.S. PATENT DOCUMENTS

| | | |
|---|---|---|
| 3,916,099 * | 10/1975 | Hlady .............................. 178/18.03 |
| 4,825,212 | 4/1989 | Adler et al. . |
| 5,379,269 * | 1/1995 | Sindeband et al. ............... 178/18.04 |
| 5,573,077 * | 11/1996 | Knowles ........................... 178/18.04 |
| 5,751,382 * | 5/1998 | Yamada et al. ...................... 345/104 |
| 5,854,450 * | 12/1998 | Kent .................................. 178/18.04 |
| 5,955,198 * | 9/1999 | Hashimoto et al. .............. 178/18.03 |

FOREIGN PATENT DOCUMENTS

WO 93/15489    8/1993   (WO) .

* cited by examiner

*Primary Examiner*—Richard Hjerpe
*Assistant Examiner*—Benjamin D. Bowers

(57) ABSTRACT

The present invention is directed to a touch screen sensor 10 that reduces or eliminates echoes or reflections of ultrasonic waves generated by one or more transducers 12. The touch screen sensor 10 is comprised of a wave absorption material 16 positioned around at least a portion of the perimeter 35 of the touch screen sensor 10.

29 Claims, 7 Drawing Sheets

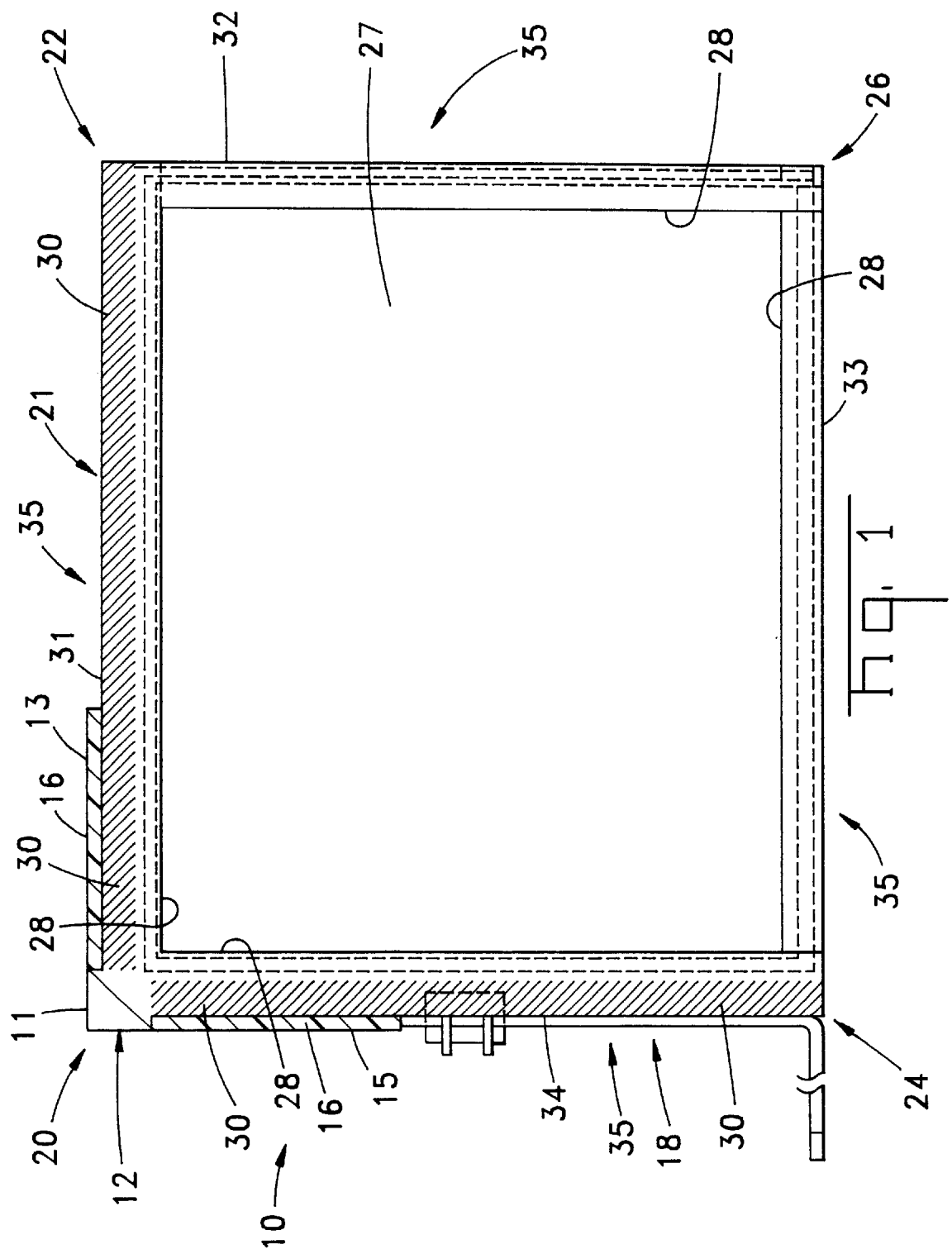

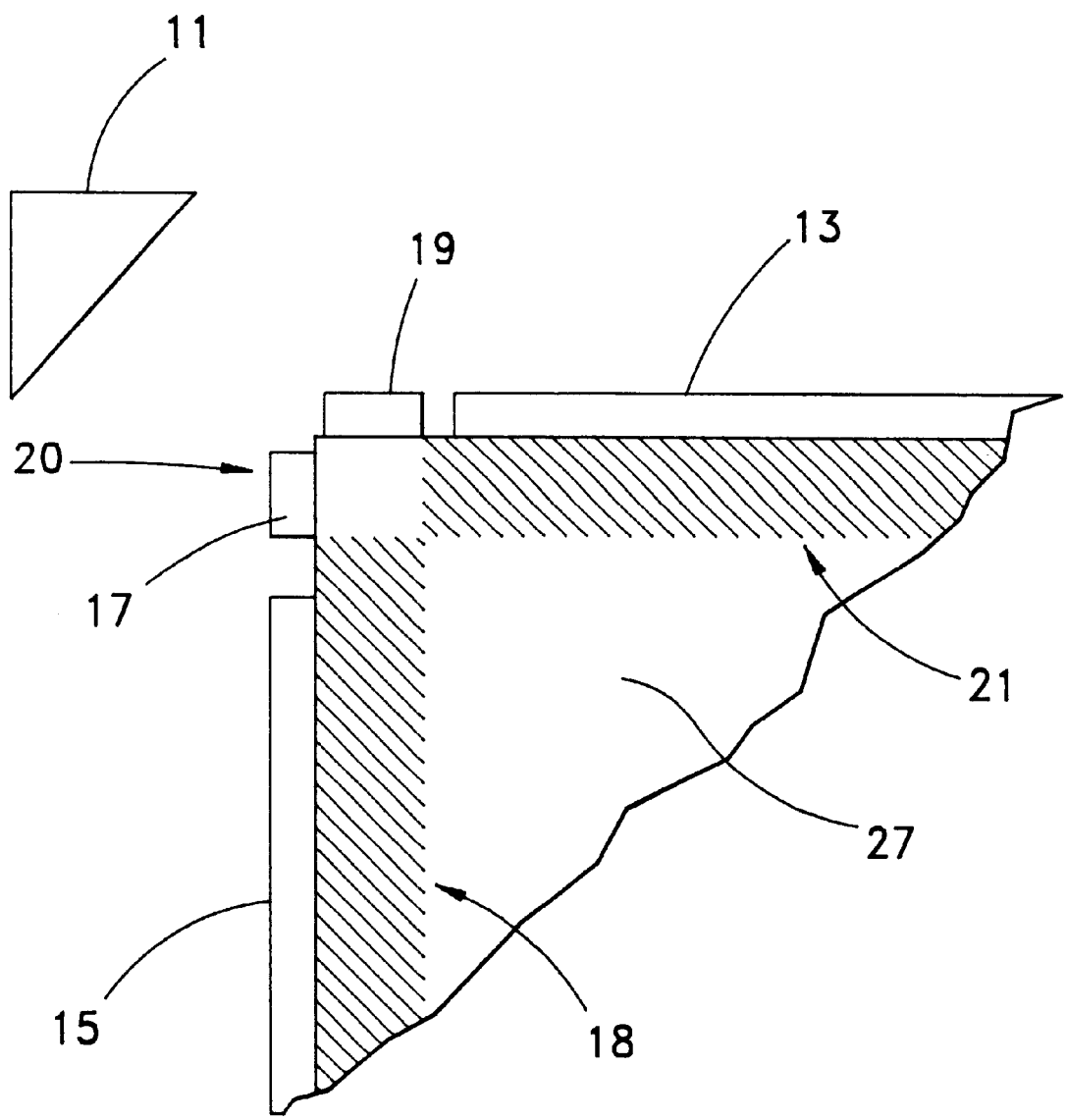

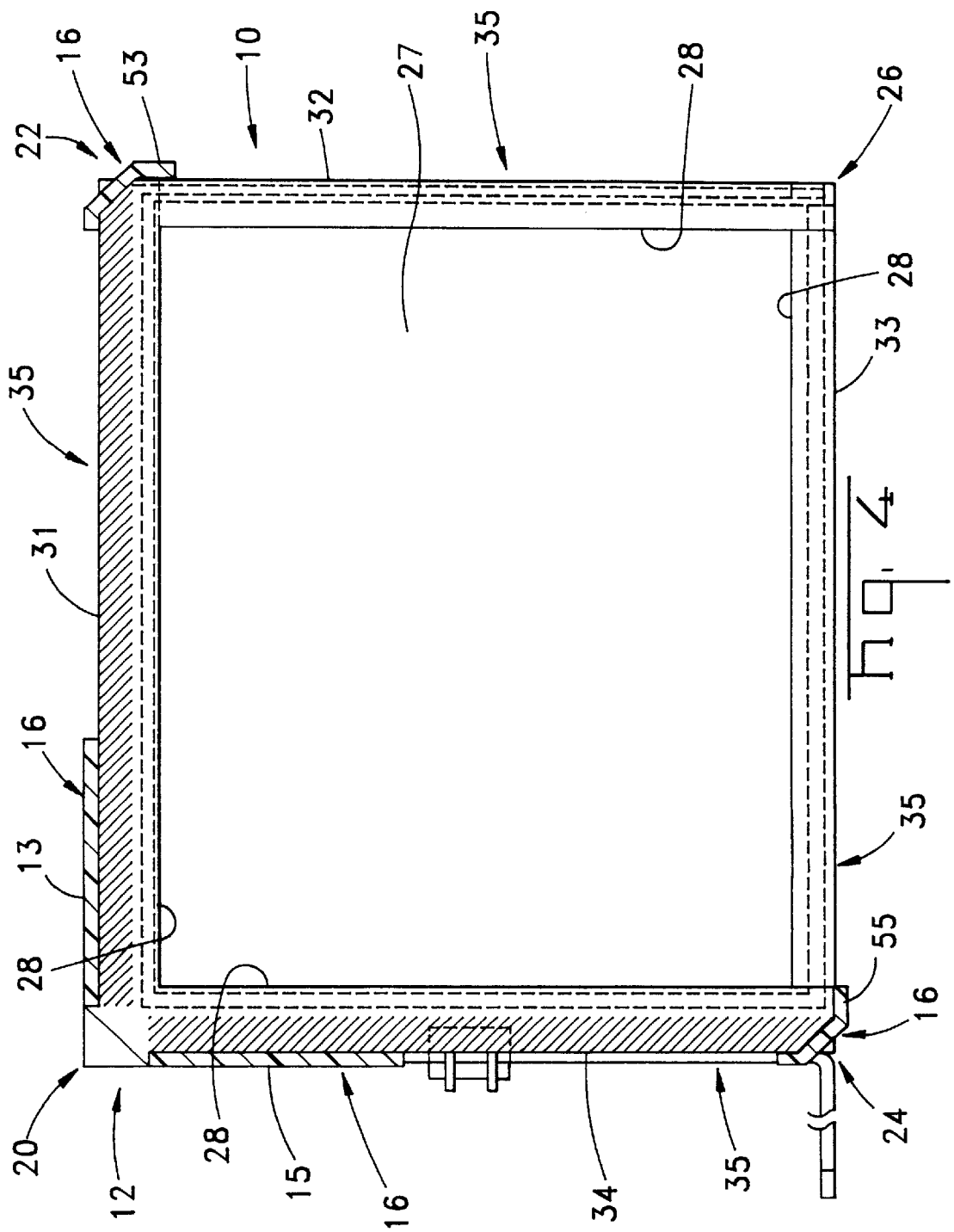

EDGE TREATMENT METHOD FOR ULTRASONIC WAVE ABSORPTION

BACKGROUND OF THE INVENTION

1. FIELD OF THE INVENTION

The present invention is related to touch screen sensors, and, more particularly, to a touch screen sensor having a wave absorption material positioned around at least a portion of the touch screen.

2. DESCRIPTION OF THE RELATED ART

Touch screen technology is frequently employed in many settings to facilitate communication with computer systems, e.g., automatic teller machines, cash registers, manufacturing equipment, etc. Touch screens may be made from a variety of materials, such as, for example, glass, metal, plastic, etc.

Typically, a touch screen sensor is comprised of a plurality of reflector arrays and two or more piezoelectric transducers attached to the touch screen sensor.

In general, the piezoelectric transducers are used to generate ultrasonic waves that travel within the touch screen sensor along two different axes, e.g., "x" and "y" axes. As the generated wave travels, fractions of the generated wave are deflected across an active area of the sensor by the reflector arrays. Ultimately, the deflected portions of the original wave are returned to, for example, a receiving transducer where they are converted into electrical signals.

An absorber, such as a finger in contact with the touch screen sensor, draws energy from the fractions of the ultrasonic wave that are deflected across the active area of the touch screen sensor. The reduction in energy of the transmitted pulse appears as a dip in a wave train of the pulse. The location of the dip in time is proportional to the position of the absorber, i.e., the finger, in the subject direction, i.e., in the x-direction. This same technique can be used to determine the location of the touch in the y-direction. Through use of this technique, as well as others known to those skilled in the art, the coordinates of the absorber, i.e., the finger, can be determined. Of course, the determined position of the touch corresponds to a computer command or response, such as, "START," "COMPLETE," "ENTER," "OK," etc.

As the ultrasonic waves are sent out, deflected across the active area of the touch screen sensor, and returned to a receiving transducer, a variety of spurious reflections or echoes of all or a portion of the ultrasonic waves may be generated. Examples of such spurious reflections or echoes include, but are not limited to, second pass reflections, array diffraction echo, corner echo, back edge bounce back reflections, etc. Unabated, such reflections or echoes can cause distortion and errors in the signals received by the receiving transducer. For example, some or all of the reflections may act to completely mask the electronic indication of a touch in the active area of the screen.

One technique currently used to attempt to reduce these type of problems involves the use of a silicone gel positioned between the touch screen sensor and a separate back plate that is used to provide mechanical support to the touch screen sensor itself.

The present invention is directed to an improved touch screen sensor that reduces or eliminates some or all of the above-identified problems.

SUMMARY OF THE INVENTION

The present invention is directed to a touch screen sensor that may be used to reduce or eliminate spurious reflections. The touch screen sensor is comprised of a plurality of edges and a perimeter. The apparatus is further comprised of a wave absorption material positioned on at least one of the edges of the touch screen sensor. The wave absorption material extends at least partially around the perimeter of the touch screen sensor.

In another embodiment of the present invention, the touch screen sensor is comprised of a plurality of edges, a plurality of reflector arrays and at least two sections of a wave absorption material. Each of the sections of the wave absorption material are positioned on one of the edges of the touch screen sensor adjacent one of the reflector arrays.

BRIEF DESCRIPTION OF THE DRAWINGS

The invention may be understood by reference to the following description taken in conjunction with the accompanying drawings, in which like reference numerals identify like elements, and in which:

FIG. 1 is a front view of a touch screen sensor employing one illustrative embodiment of the present invention;

FIG. 2 is an exploded view of an illustrative transducer and shield that may be employed with the present invention;

FIG. 4 is a front view of a touch screen sensor employing an alternative illustrative embodiment of the present invention;

Figure 3A:
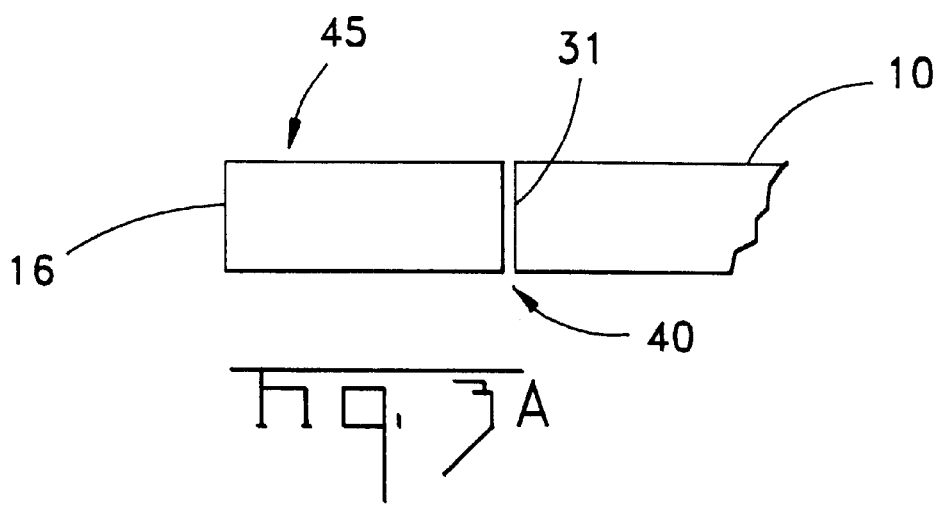
FIG. 3A is one illustrative embodiment of the interface between the wave absorption material and the touch screen sensor.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers, specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached drawings. As shown in FIG. 1, a touch screen sensor 10 is comprised of a plurality of arrays 18, 21 of acoustic reflectors 30, edges 31, 32, 33 and 34, a perimeter 35, and first, second, third and fourth corners 20, 22, 24 and 26, respectively. The touch screen sensor 10 is further comprised of sections 13, 15 of a wave absorption material 16 (discussed more fully below) positioned around at least a portion of the perimeter 35 of the touch screen sensor 10. The touch screen sensor 10 is further comprised of an active area 27 defined by active area boundaries 28.

In one illustrative embodiment, a plurality of transducers 17, 19 (see FIG. 2) are coupled to the first corner 20 of the touch screen sensor 10. An electromagnetic interference shield 11 is positioned over the transducers 17, 19 to reduce electromagnetic fields produced by the transducers 17, 19.

As those skilled in the art will recognize, the touch screen sensor 10 may be comprised of a variety of materials, such as glass, metal and plastic. As shown in FIG. 2, two transducers 17, 19 are coupled to the touch screen sensor 10. However, the present invention is readily applicable to touch screen sensors employing more than two transducers, and the transducers may be positioned at locations other than the position indicated in FIG. 1. In one illustrative embodiment, the transducers 17, 19 are x-cut lithium niobate crystal that may operate in a pulse echo mode.

Figure 3B:
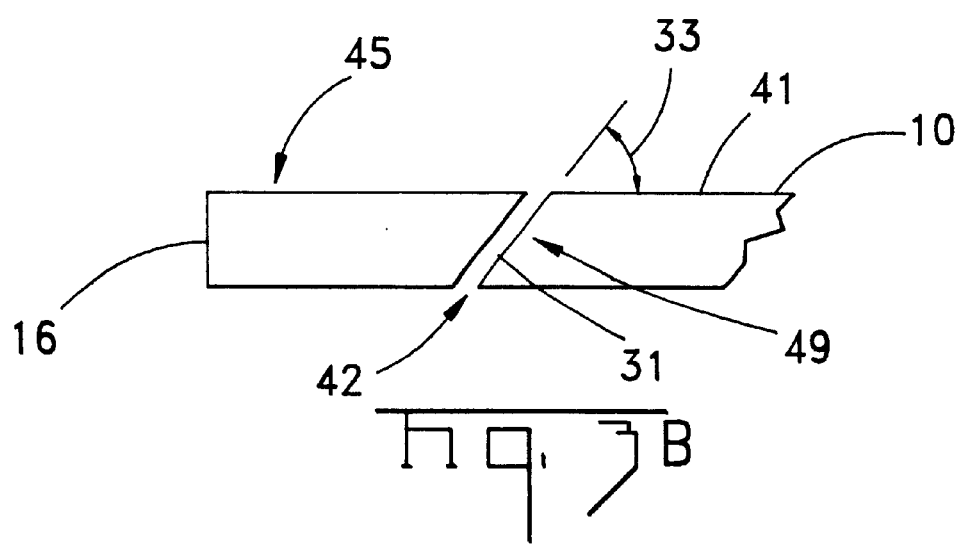
FIG. 3B is an alternative illustrative embodiment of the interface between the wave absorption material and the touch screen sensor.
Figure 3C:
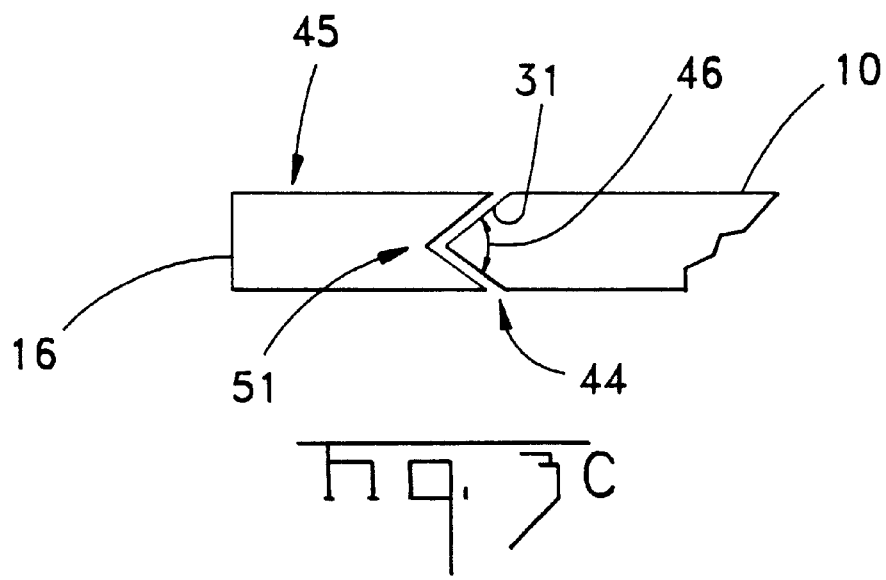
FIG. 3C is yet another illustrative embodiment of the interface between the wave absorption material and the touch screen sensor.

As indicated in FIGS. 1 and 3A–3C, the wave absorption material 16 may engage the edges 31–34 of the touch screen sensor 10 in a variety of interface configurations. For example, the wave absorption material 16 may engage illustrative edge 31 of the touch screen sensor 10 at an approximately square interface 40 (as shown in FIG. 3A), a beveled interface 42 (as shown in FIG. 3B), a double beveled interface 44 (as shown in FIG. 3C), or it may be a rounded or semicircular interface (not shown). A variety of configurations for the edge 31 and its interface with the wave absorption material 16 will be apparent to those skilled in the art upon a complete reading of the present application.

The wave absorption material 16 and the illustrative edge 31 are depicted as separated by a space for purposes of clarity. The precise angles of the beveled surfaces depicted in FIGS. 3B and 3C are matters of design choice that may vary depending upon the application. Of course, if desired, the beveled interface 42 shown in FIG. 3B may be formed in the opposite direction. Additionally, only a portion of the illustrative edge 31 may be beveled, with the remainder of the edge 31 being rounded or truncated, for example. Similarly, the double beveled interface 44 may be formed inwardly on the touch screen sensor 10.

In one embodiment, as depicted in FIG. 3B, the illustrative edge 31 of the touch screen sensor 10 is formed at an angle 33 ranging from approximately 20–40 degrees relative to the upper surface 41 of the touch screen sensor. In yet another illustrative embodiment, as depicted in FIG. 3C, the illustrative edge 31 of the touch screen sensor 10 may have a double bevel in which the included angle 46 of the double bevel may range from approximately 20–80 degrees.

The wave absorption material 16 may be of any desired thickness. In one illustrative embodiment, the wave absorption material 16 may be approximately the same thickness as the thickness of the touch screen sensor 10. Of course, the thickness of the absorption material may be greater or less than the thickness of the touch screen sensor 10. Moreover, the wave absorption material 16 may, when finished, have any desired configuration, i.e., it is not limited to the generally rectangular cross-sectional configuration depicted in FIGS. 3A–3C. Through use of the present invention, a thicker touch screen sensor 10 may be employed. That is, an illustrative glass touch screen sensor 10 may have a thickness ranging from approximately 0.020–0.125 inches. In some applications, this may eliminate the need for additional backing plates laminated to the sensor 10 to provide mechanical support. Of course, the width of the wave absorption material (in the direction parallel to the surface of the touch screen sensor) may be varied as a matter of design choice. For example, the width of the wave absorption material 16 may range between approximately 0.030–0.25 inches.

Depending upon the particular application, the width 45 of the absorption material 16 may vary. For the embodiment depicted in FIG. 3B, the width 45 of the wave absorption material 16 would be measured from approximately the midpoint 49 of the beveled interface 42. For the embodiment depicted in FIG. 3C, the width 45 of the wave absorption material 16 would be measured from approximately the midpoint 51 of the double beveled interface 44.

In one illustrative embodiment where the touch screen sensor 10 is comprised of glass approximately 0.040 inches thick, and the transducers 17, 19 are 5 MHz piezoelectric transducers, the wave absorption material 16 has a double bevel configuration as depicted in FIG. 3C (having an included angle of approximately 30 degrees) and is approximately 0.040 inches thick and 0.125 inches wide.

The wave absorption material 16 may be comprised of a variety of materials. In general, it would be desirable for the wave absorption material 16 to have an acoustic impedance that matches that of the touch screen sensor 10, yet still be able to absorb spurious reflections and echoes. The wave absorption material 16 may be comprised of a polymer-based material, such as an epoxy material, an adhesive material, an elastomeric material, or combinations thereof. Of course, if desired, other materials, e.g., metal powders, may be added to the material to result in the final wave absorption material product. For example, the wave absorption material 16 may be comprised of a bisphenol A epoxy, such as Araldite D (trademark of Ciba-Geigy) or Eccosorb CR (trademark of Emerson & Cuming). Alternatively, the wave absorption material 16 may be comprised of an acrylic adhesive, such as UV Adhesive 349 (trademark of Loctite). The wave absorption material 16 may also be comprised of an elastomeric adhesive, such as DP-605 NS (trademark of 3M) urethane or like materials. Combinations of these materials may also be used. In the case where the wave absorption material 16 is comprised of an epoxy, an elastomer modified epoxy functional adduct material may also be used. For example, Shell EPON Resin 58005 and 58006 or other similar materials may be used.

If desired, other filler materials may be added to the polymer-based materials used for the wave absorption material. For example, these additional filler materials may be comprised of a metal (e.g., tungsten powder, lead powder, etc.), an inorganic material (e.g., titanium dioxide, graphite, silica, etc.), or an organic material (e.g., the Shell EPON Resin discussed above). These additional materials may be added for a variety of reasons, e.g., to match the acoustic impedance (density times sound velocity) of the touch screen sensor 10 by increasing the density of the completed wave absorption material 16, and to act as a scatterer of the acoustic wave as it enters the wave absorption material 16. The elastomer, or other like material, is added because it is a very good absorber of the generated waves, it helps to scatter some of the acoustic wave, and it improves the ability of the completed wave absorption material 16 to withstand thermally induced stresses.

In one particular illustrative embodiment designed for use with a touch screen sensor comprised of glass, the wave absorption material 16 may be comprised of Eccosorb CR-124 (trademark of Emerson & Cuming) epoxy combined with 20 weight percent of tungsten powder and 25 weight percent of EPON Resin 58005 (trademark of Shell) elastomer. In this embodiment, the wave absorption material 16 has a density of approximately 4.5 grams/cm$^3$. Of course, the density of the final wave absorption material 16 may vary, and may range between 1.0–7.0 grams/cm$^3$.

One purpose of the wave absorption material 16 is to absorb spurious echoes and reflections that result from, or are generated as, pulse waves from the transducers are reflected across the active area 27 of the touch screen sensor 10 and returned to the receiving transducer. Depending on the type of reflections or echoes to be reduced or eliminated, the wave absorption material 16 may be placed in various locations around the perimeter 35 of the touch screen sensor 10.

For example, in an effort to reduce, among other things, what is known as second pass reflections, sections 13 and 15 of the wave absorption material 16 may be positioned as indicated in FIG. 1. In this particular illustrative embodiment, the sections 13 and are adjacent to the transducers 13, 15 and extend along the edges 31 and 34, respectively, of the touch screen sensor 10 for a distance equal to approximately one third of the touch screen width and height, respectively.

As shown in FIG. 4, multiple sections of the wave absorption material 16 may be positioned at various locations around the perimeter 35 of the touch screen sensor 10. For example, additional sections 53, 55 of the wave absorption material 16 may be positioned around the second corner 22 and third corner 24, respectively, of the sensor 10 to assist in reducing or eliminating reflected acoustic waves from beam spreading due to diffraction effects in the array. As depicted in FIG. 4, the section 53 extends around the corner 22 for a distance along the edges 31 and 32 of the sensor 10. The distance that section 53 extends along the edges 31 and 32 may vary. In one embodiment, the section 53 extends along the edges 31 and 32 until it intersects the projection of lines 28 that define the active area 27 of the touch screen sensor 10. The section 55 may be positioned around the corner 24 in a similar manner.

Figure 5:
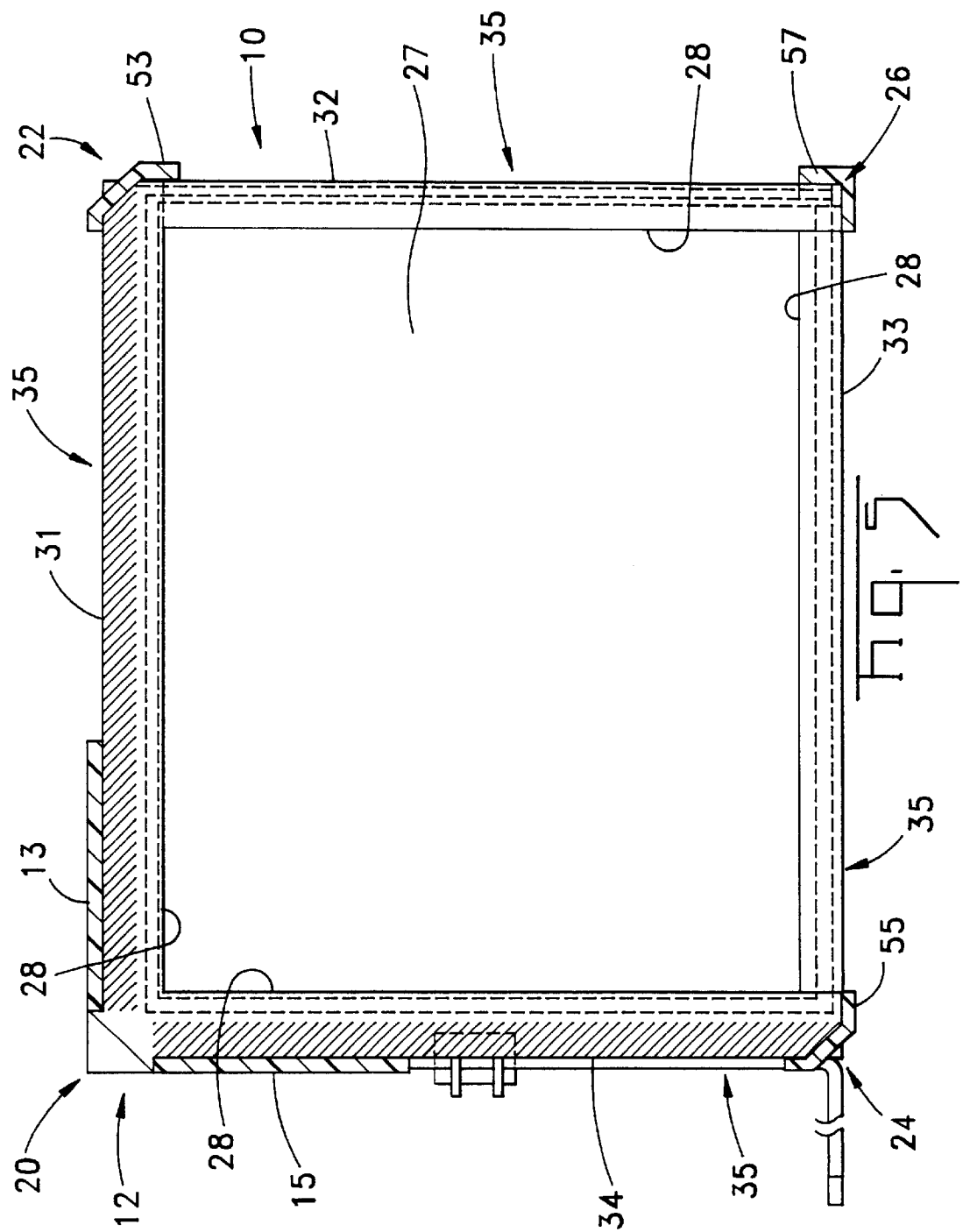
FIG. 5 is a front view of a touch screen sensor employing another illustrative embodiment of the present invention.
Figure 5A:
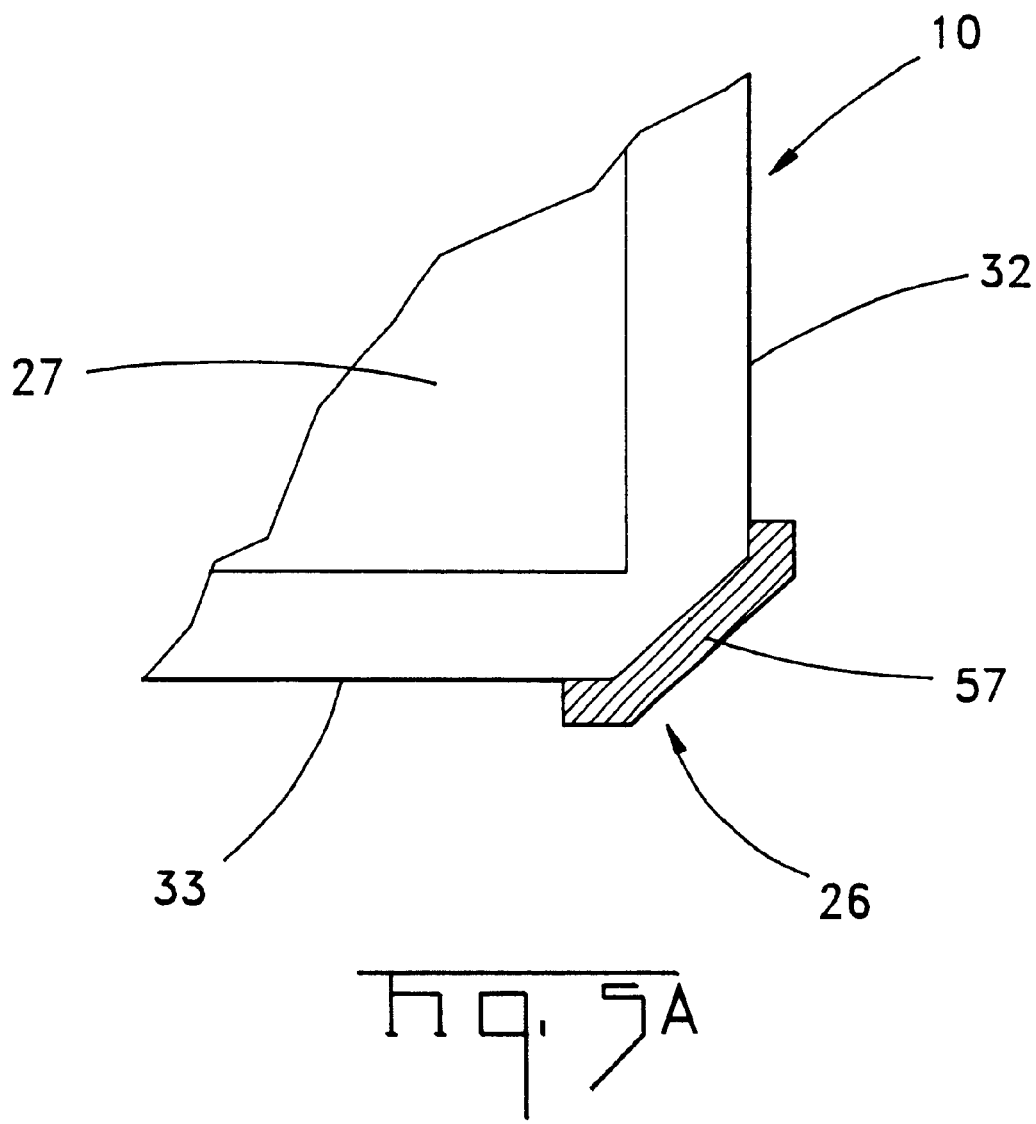
FIG. 5A is an alternative embodiment of a touch screen sensor in accordance with the present invention.

As depicted in FIG. 5, a section 57 of the wave absorption material 16 may also be applied to the fourth corner 26 of the touch screen sensor 10. The section 57 assists in reducing or eliminating far corner echoes. The section 57 may, likewise, extend for a distance along the edges 32 and 33 until it intersects the projection of the lines 28 that define the active area 27 of the touch screen sensor 10. If desired, the fourth corner 26 of the touch screen sensor 10 may be cut at an angle of approximately 45 degrees, as indicated in FIG. 5A, before the section 57 is formed thereon. Of course, depending upon the particular application, the section 57 depicted in FIG. 5 or 5A may be used on a touch screen sensor 10 by itself, i.e., sections 13, 15, 53 and 55 may be omitted entirely from the touch screen sensor 10 depicted in FIG. 5.

Figure 6:
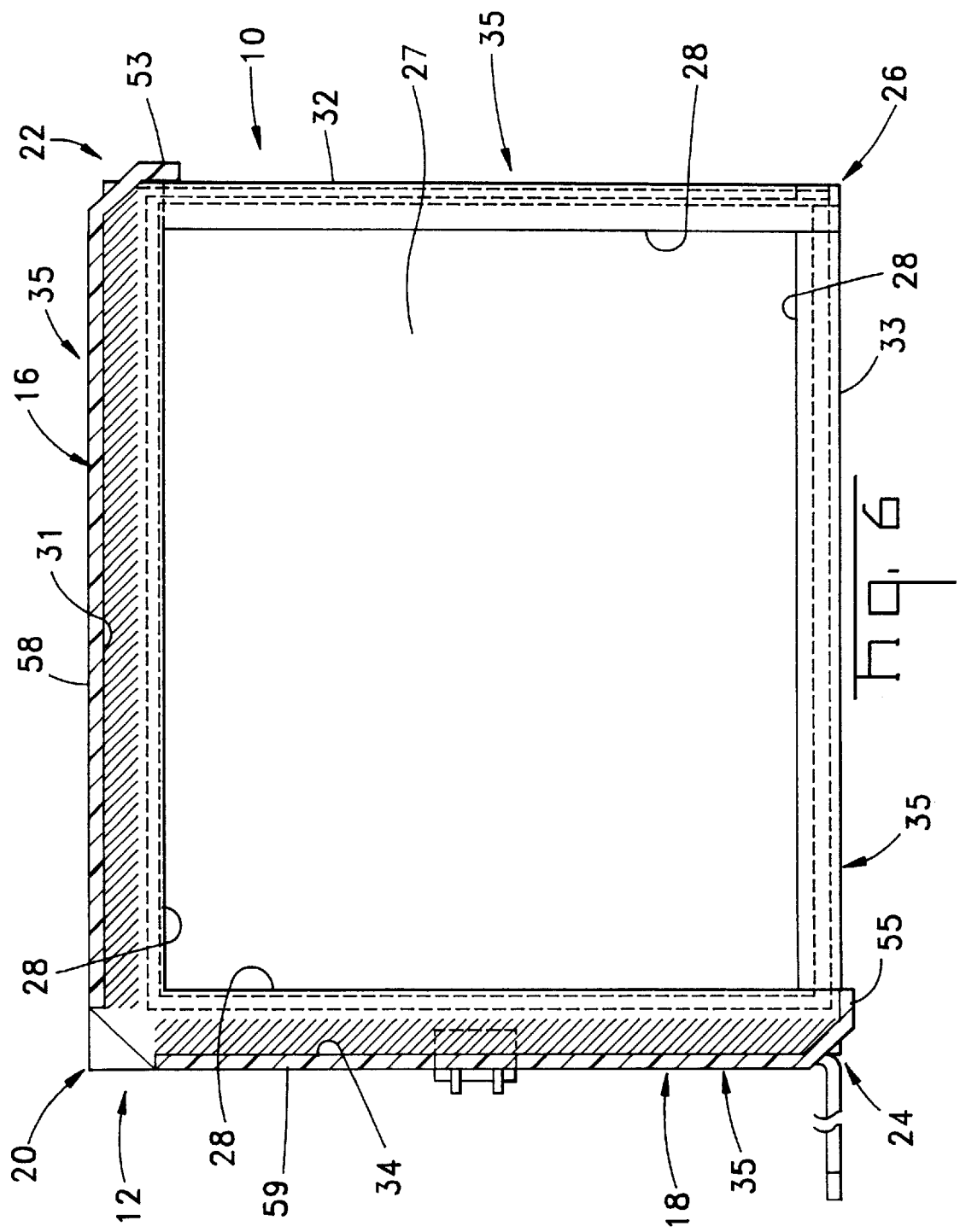
FIG. 6 is a front view of a touch screen sensor employing yet another illustrative embodiment of the present invention.

FIG. 6 depicts yet another illustrative embodiment of the present invention. As shown therein, sections 58 and 59 of the wave absorption material 16 are positioned around a portion of the perimeter 35 of the touch screen sensor 10. As shown in FIG. 6, the section 58 extends from adjacent the transducers 12 along the edge 31, around the second corner 22, and along a portion of the edge 32 of the touch screen sensor 10. Similarly, the section 59 extends from adjacent the transducers 12 along the edge 34, around the third corner 24, and along a portion of the edge 34 of the touch screen sensor 10. Positioning the wave absorption material 16 completely behind the arrays 18, 21 assists in reducing back edge spurious reflections due to poor edge quality, as well as the other forms of reflections and echoes discussed above. Additionally, if desired, a section of the wave absorption material 16, similar to section 57 shown in FIG. 5 or SA, may be positioned around the fourth corner 26 of the touch screen sensor 10 if corner echo is a problem.

As will be readily apparent to one skilled in the art after a reading of the present application, the wave absorption material 16 may be placed at various points around the perimeter 35 of the touch screen sensor 10. The decision of where to position the wave absorption material 16 is a matter of design choice that may vary depending upon the particular application. Thus, the present invention should not be considered limited to touch screen sensors having a wave absorption material located in the illustrative location depicted in the drawings. Moreover, if desired, a backing plate and silicone gel may also be used with a touch screen sensor 10 in accordance with the present invention.

The wave absorption material 16 may be applied to the edge of the touch screen sensor 10 by a variety of known techniques. For example, in the case where the touch screen sensor is comprised of glass, the epoxy compound described above may be applied to the edge of the touch screen by hand, e.g., painting or rolling, and, thereafter, cured by heating to, for example, 75° C. for a period of 12 hours.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   a touch screen sensor, said touch screen sensor having a plurality of edges and a perimeter; and
   a wave absorption material positioned on at least one of said edges of said touch screen sensor, said wave absorption material extending at least partially around said perimeter of said touch screen sensor;
   wherein at least a portion of said wave absorption material has a beveled edge.

2. The apparatus of claim 1, wherein said wave absorption material is comprised of a polymer-based material.

3. The apparatus of claim 1, wherein said wave absorption material is comprised of an epoxy, an adhesive, or an elastomeric material.

4. The apparatus of claim 1, wherein said wave absorption material is comprised of a filler material comprised of a metallic powder, an inorganic material or an organic material.

5. The apparatus of claim 2, wherein said wave absorption material is comprised of a filler material comprised of a metallic powder, an inorganic material, or an organic material.

6. The apparatus of claim 1, wherein said wave absorption material is comprised of a bisphenol A epoxy, an elastomeric material, and a metallic powder.

7. The apparatus of claim 1, wherein said touch screen sensor and said wave absorption material engage each other at a non-square interface.

8. The apparatus of claim 1, wherein said touch screen sensor and said wave absorption material engage each other at a beveled interface.

9. The apparatus of claim 1, wherein said touch screen sensor and said wave absorption material engage each other at a double beveled interface.

10. The apparatus of claim 1, wherein at least a portion of said edge of said touch screen sensor has a beveled surface.

11. The apparatus of claim 1, wherein said touch screen sensor has a thickness, and said wave absorption material has a thickness that is substantially the same as the thickness of said touch screen sensor.

12. The apparatus of claim 1, wherein said wave absorption material has a width that ranges from approximately 0.030–0.250 inches.

13. The apparatus of claim 1, wherein said touch screen sensor and said wave absorption material engage one another at an approximately square interface.

14. The apparatus of claim 1, wherein said wave absorption material has a density of at least approximately 4.5 grams/cm$^3$.

15. An apparatus, comprising:
a touch screen sensor, said sensor comprised of a plurality of edges and a plurality of reflector arrays; and
at least two sections of a wave absorption material, each of said at least two sections being positioned on one of said edges adjacent one of said plurality of reflector arrays;
wherein at least a portion of said wave absorption material has a beveled edge.

16. The apparatus of claim 15, wherein said touch screen sensor further comprises a first corner, said first corner of said sensor adapted for the coupling of at least one piezoelectric transducer thereto, each of said at least two section of a wave absorption material being positioned adjacent said first corner.

17. The apparatus of claim 16, wherein said touch screen sensor further comprises second and third corners, one of said at least two sections of a wave absorption material being further positioned adjacent said second corner, the other of said at least two sections of a wave absorption material being further positioned adjacent said third corner.

18. The apparatus of claim 16, wherein one of said at least two sections of a wave absorption material is further positioned around said second corner and the other of said at least two sections of a wave absorption material is further positioned around said third corner.

19. The apparatus of claim 15, wherein said wave absorption material is comprised of a polymer-based material.

20. The apparatus of claim 15, wherein said wave absorption material is comprised of an epoxy, an adhesive, or an elastomeric material.

21. The apparatus of claim 15, wherein said wave absorption material is comprised of a filler material comprised of a metallic powder, an inorganic material or an organic material.

22. The apparatus of claim 20, wherein said wave absorption material is comprised of a filler material comprised of a metallic powder, an inorganic material, or an organic material.

23. The apparatus of claim 15, wherein said touch screen sensor is comprised of glass, metal or plastic.

24. The apparatus of claim 15, wherein said wave absorption material is comprised of a bisphenol A epoxy, an elastomeric material, and a metallic powder.

25. The apparatus of claim 15, wherein said touch screen sensor and said wave absorption material engage each other at a non-square interface.

26. The apparatus of claim 15, wherein said touch screen sensor and said wave absorption material engage each other at a beveled interface.

27. The apparatus of claim 15, wherein said touch screen sensor has a thickness, and said wave absorption material has a thickness that is substantially the same as the thickness of said touch screen sensor.

28. A touch screen sensor, comprising:
a plurality of edges;
first, second and third corners;
first and second reflector arrays, said first reflector array positioned between said first and second corners, said second reflector array positioned between said first and third corners;
a first section of a wave absorption material positioned on a first edge of said screen, said first section extending from said first corner, along said first reflector array, around said second corner and onto a second edge; and
a second section of a wave absorption material positioned on a third edge of said screen, said second section extending from said first corner, along said second reflector array, around said third corner and onto a fourth edge.

29. A touch screen sensor, comprising:
a plurality of edges;
first, second and third corners;
first and second reflector arrays, said first reflector array positioned between said first and second corners and said second reflector array positioned between said first and third corners;
a first section of a wave absorption material extending from a first edge around said second corner and onto a second edge; and
a second section of a wave absorption material extending from a third edge around said third corner and onto a fourth edge.

* * * * *